(12) United States Patent
Johansen et al.

(10) Patent No.: US 8,084,008 B2
(45) Date of Patent: Dec. 27, 2011

(54) PRODUCTION OF SATURATED AMMONIA STORAGE MATERIALS

(75) Inventors: Johnny Johansen, Copenhagen S (DK); Henrik Wagner-Pedersen, Humlebaek (DK); Jakob Svagin, Frederiksberg (DK); Tue Johannessen, Glostrup (DK); Ulrich J. Quaade, Bagsvaerd (DK)

(73) Assignee: Amminex A/S, Soborg (DK)

( * ) Notice: Subject to any disclaimer, the term of this patent is extended or adjusted under 35 U.S.C. 154(b) by 0 days.

(21) Appl. No.: 12/576,582

(22) Filed: Oct. 9, 2009

(65) Prior Publication Data

US 2010/0266475 A1    Oct. 21, 2010

Related U.S. Application Data

(60) Provisional application No. 61/169,776, filed on Apr. 16, 2009.

(51) Int. Cl.
*C01C 1/00* (2006.01)
*B01D 53/56* (2006.01)
*C09K 3/00* (2006.01)

(52) U.S. Cl. ............ 423/352; 423/239.1; 252/193
(58) Field of Classification Search .......... None
See application file for complete search history.

(56) References Cited

U.S. PATENT DOCUMENTS

| | | | |
|---|---|---|---|
| 3,354,205 A * | 11/1967 | Marten | 564/71 |
| 4,386,501 A * | 6/1983 | Jaeger | 62/112 |
| 5,161,389 A | 11/1992 | Rockenfeller et al. | |
| 2008/0153697 A1 * | 6/2008 | Shiflett et al. | 502/439 |

FOREIGN PATENT DOCUMENTS

| | | |
|---|---|---|
| WO | WO 99/01205 | 1/1999 |
| WO | 2005091418 | * 9/2005 |
| WO | WO 2006/012903 | 2/2006 |
| WO | WO 2006/081824 | 8/2006 |
| WO | 2007000170 | * 1/2007 |
| WO | WO 2007/000170 | 1/2007 |

OTHER PUBLICATIONS

Ashrae Standards, http://www.ashrai.org/technology/page/1933; printed Dec. 1, 2009, pp. 1-8.
Bates, A.R. et al., "Elastic and Thermodynamic behavior at the phase transitions of some hexa-ammine metal (II) complexes," J. of Phys. C: Solid State Phys., vol. 16 (1983) pp. 2847-2859.

* cited by examiner

*Primary Examiner* — Melvin Mayes
*Assistant Examiner* — Sheng H Davis
(74) *Attorney, Agent, or Firm* — Steven J. Goldstein; Frost Brown Todd LLC

(57) ABSTRACT

A process for saturating a material capable of binding ammonia by ad- or absorption and initially free of ammonia or partially saturated with ammonia comprises treating said material under a pressure and associated temperature located on the vapor pressure curve of ammonia with an amount of liquid ammonia sufficient to saturate said material and an additional amount of a cooling agent selected from liquid ammonia, liquid or solid $CO_2$, hydrocarbons and hydrohalocarbons that have a higher vapor pressure than ammonia, ethyl ether, methyl formate, methyl amine and ethyl amine, such that $|Q_{abs}| \leq |Q_{evap}| + Q_{ext}$, wherein $Q_{abs}$ is the amount of heat released from said material when it absorbs ammonia from the liquid phase thereof to the point where it is saturated with ammonia, $Q_{evap}$ is the amount of heat absorbed by said cooling agent when it evaporates, and $Q_{ext}$ is the amount of heat exchanged with the surroundings and is positive, if heat is removed from the process by external cooling, and negative, if heat is added to the process from the surroundings.

17 Claims, 3 Drawing Sheets

Evaporation Curve of Ammonia

PRODUCTION OF SATURATED AMMONIA STORAGE MATERIALS

This application is based upon and claims priority from U.S. Provisional Application Ser. No. 61/169,776, filed Apr. 16, 2009, incorporated herein by reference. This invention relates to a method for saturating materials capable of binding ammonia with ammonia and particularly to the production of ammonia containing metal ammine salts of the general form $M_a(NH_3)_rX_z$.

FIELD OF THE INVENTION

Background of the Invention

Ammonia is a widely used chemical with many applications. One specific application is as reductant for selective catalytic reduction (SCR) of NO in exhaust gas from combustion processes.

For most applications, and in particular in automotive applications, the storage of ammonia in the form of a pressurized liquid in a vessel is too hazardous. Urea is a safe, but an indirect and impractical method for mobile transport of ammonia since it requires to be transformed into ammonia by a process involving thermolysis and hydrolysis ($(NH_2)_2CO + H_2O \rightarrow 2\ NH_3 + CO_2$).

A storage method involving ad- or absorption in a solid can circumvent the safety hazard of anhydrous liquid ammonia and the decomposition of a starting material.

Metal ammine salts are ammonia absorbing and desorbing materials, which can be used as solid storage media for ammonia (see, e.g. WO 2006/012903 A2), which in turn, as mentioned above, may be used as the reductant in selective catalytic reduction to reduce $NO_x$ emissions.

Usually, ammonia is released by thermal desorption, e.g. from metal ammine salts, by external heating of a storage container, see e.g. WO 1999/01205 A1. The heating elements may also be placed inside the storage container, see e.g. U.S. Pat. No. 5,161,389 and WO 2006/012903 A2.

In WO 2007/000170 A1 the release of ammonia from the storage material is facilitated by lowering the ammonia pressure in the gas phase.

The performance of the above-mentioned ammonia-consuming systems is not dependent of the way of producing the dense ammonia-saturated materials. A method of producing dense ammonia saturated materials is disclosed in EP 1 868 941 A2. Here, the storage material is first saturated using gaseous ammonia as a non-compact material, then compacted using mechanical pressure into a dense block before finally placing the dense block in a container. For this compaction method to be attractive in bulk production, an efficient production of saturated storage material is needed. The ways of saturation described in the prior art are: 1. Applying a pressure of gaseous ammonia to the salt. This method is slow (for example saturating 3 kg $SrCl_2$ with 6 bar pressure of ammonia takes 3 days). 2. Dissolving the salt in liquid ammonia and subsequently evaporating the ammonia (J. Phys. C: Solid State Phys., 16 (1983), 2847-2859). This method only works for materials that are easily dissolvable in liquid ammonia (which for example is not the case for the attractive storage material $SrCl_2$) and is inefficient since large amounts of excess ammonia have to be evaporated. 3. Direct exposure of a salt depleted of ammonia to liquid ammonia (WO 2006/081824 A1). No further details are given in this reference.

What is needed is a fast and efficient method for saturating ammonia storage materials.

SUMMARY OF THE INVENTION

The invention relates to a process for saturating a material capable of binding ammonia by ad- or absorption and initially free of ammonia or partially saturated with ammonia, characterized in that the process comprises treating said material under a pressure and associated temperature located on the vapor pressure curve of ammonia with an amount of liquid ammonia sufficient to saturate said material and an additional amount of a cooling agent selected from liquid ammonia, liquid or solid $CO_2$, hydrocarbons and hydrohalocarbons that have a vapour pressure higher than ammonia, ethyl ether, methyl formate, methyl amine and ethyl amine, such that $|Q_{abs}| \leq |Q_{evap}| + Q_{ext}$, wherein $Q_{abs}$ is the amount of heat released from said material when it absorbs ammonia from the liquid phase thereof to the point where it is saturated with ammonia, $Q_{evap}$ is the amount of heat absorbed by said cooling agent when it evaporates, and $Q_{ext}$ is the amount of heat exchanged with the surroundings and is positive, if heat is removed from the process by external cooling, and negative, if heat is added to the process from the surroundings.

Other features are inherent in the methods disclosed or will become apparent to those skilled in the art from the following detailed description of embodiments and its accompanying drawings.

DESCRIPTION OF THE EMBODIMENTS

Figure 1:
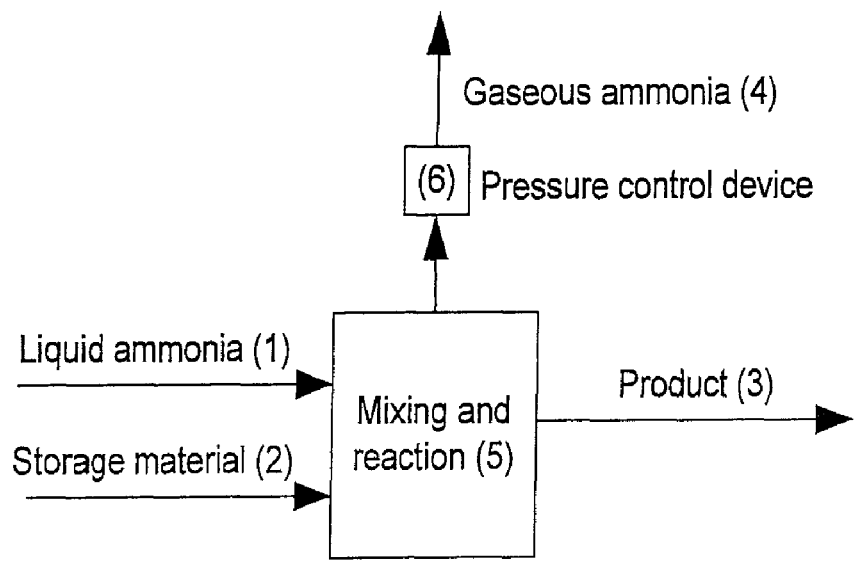
FIG. 1 shows a process flow scheme according to a first embodiment of the present process.

The reason for using solid materials that can bind ammonia by ad- or absorption ("ammonia storage materials") is the ability to handle ammonia with lower volatility than that of liquid ammonia. The latter is regarded hazardous and dangerous in many applications, especially automotive applications. The heat of evaporation for liquid ammonia is $E_e = 23.4$ kJ/mole which results in an equilibrium vapour pressure of 8 bar at room temperature.

If an ammonia storage material is intended to have a lower equilibrium vapour pressure, the binding energy of ammonia in the storage material, $E_a$, has to be higher than $E_e$. Often an equilibrium pressure in the order of 1 bar at ambient conditions is desired, which corresponds to a binding energy of about 40 kJ/mole ($NH_3$).

When saturating storage materials with gaseous ammonia an amount of heat corresponding to $E_a$·moles ammonia ((molar binding energy)·(moles ammonia)) has to be removed from the material. When saturating with liquid ammonia only an amount of heat corresponding to $Q_{abs} = (E_a - E_e)$·moles ammonia has to be removed. As bulk amounts of ammonia are always transported and delivered as liquid ammonia, saturation with liquid ammonia is highly desired. However, even with liquid ammonia heat has to be removed from the material during saturation.

The gist of the present invention is that this heat evolving during saturation can be removed by dosing a calculated amount of a cooling agent which evaporates during the saturation procedure and thus absorbs the heat and controls the reaction temperature.

If the cooling agent is ammonia, a larger amount of liquid ammonia than the amount needed to saturate the storage material is used. The excess ammonia can be replaced by another cooling agent. Such other cooling agents can be selected from liquid or solid $CO_2$, hydrocarbons and hydrohalocarbons that have a higher vapour pressure than ammonia at a given temperature, ethyl ether, methyl formate, methyl amine and ethyl amine. Suitable hydrocarbons are, e.g., methane ethane and propane, and suitable hydrohalocarbons are for e.g. tetrafluoromethane, chlorotrifluoromethane, trifluoromethane, chloromethane, and hexafluoroethane etc. Further suitable hydrohalocarbon compounds are listed in the standard: ANSI/ASHRAE 34-2007, *Designation and Safety Classification of Refrigerants* (see http://www.ashrae.org/technology/page/1933)

The total evaporation energy, $Q_{evap}$, of the excess amount of ammonia or the other cooling agent should be equal to or larger than the total amount of heat, $Q_{abs}$, released during saturation, if no heat is removed externally from the process. If heat is also removed externally from the process (e.g. by heat exchange), less heat has to be removed by evaporation of the cooling agent, i.e. $|Q_{abs}|-|Q_{ext}| \leq |Q_{evap}|$. If heat is introduced to the process from the surroundings without external removal thereof, e.g. by mixing the ammonia/cooing agent/storage material mixture whereby heat of friction is produced or because the process is conducted at a very low temperature and thereby heat is introduced through the processing equipment, the added heat must also be removed by the evaporation of the cooling agent, i.e. $|Q_{abs}|-|Q_{ext}| \leq |Q_{evap}|$.

Surroundings in the context of this application means any solid material, liquid or gas besides the components taking part in the saturation procedure, i.e. the storage material, liquid ammonia and the cooling agent. Thus, the container wherein the reaction takes place, the mixing equipment by which the reaction components are mixed, any heat exchanger, insulation and the atmosphere surrounding the equipment in which the reaction takes place, are all part of the surroundings.

If ammonia is used as the cooling agent, the ammonia acts as saturation agent and cooling agent simultaneously.

Figure 6:
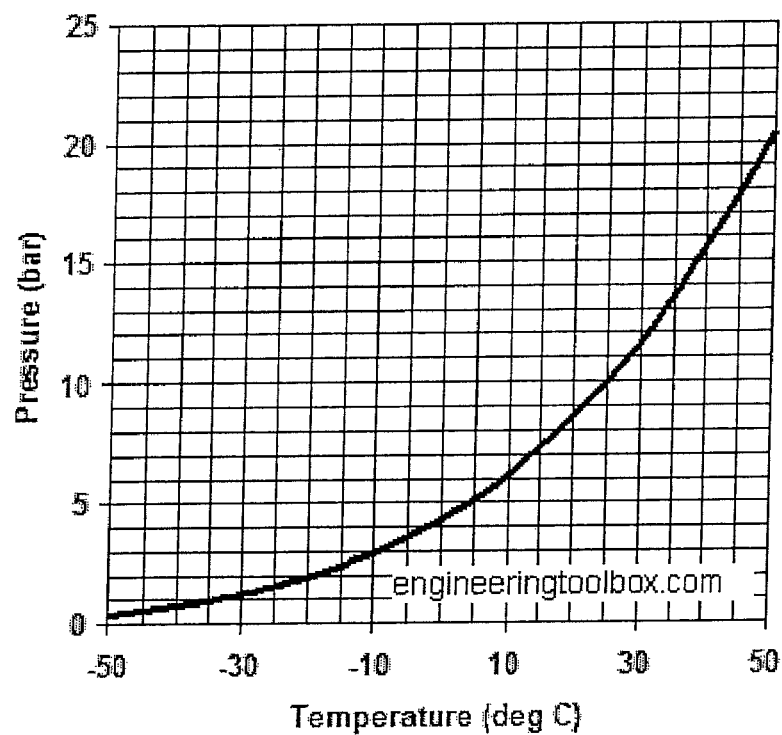
FIG. 6 shows the evaporation curve of ammonia.

When liquid ammonia is present in the reactor the process temperature is defined by the evaporation pressure according to the gas-liquid equilibrium of ammonia (see the evaporation curve in FIG. 6). Thus by controlling the reaction pressure the reaction temperature is uniquely defined. The reaction pressure may vary over the whole course of the process, e.g. by using a pressure ramp or another controlled pressure curve, or may be constant during parts of the process.

The material may bind ammonia by adsorption or absorption. Materials that bind ammonia by adsorption are, e.g., acidic carbon or certain zeolites. Materials that bind ammonia by absorption, are e.g. certain metal salts.

The materials used in the method of the present invention are initially free of ammonia, i.e. no ammonia is ad- or absorbed on or in them, respectively, or they are partially saturated with ammonia. Partially saturated with ammonia means that some amount if ammonia is ad- or absorbed on or in them, respectively, however not the amount of ammonia they can maximally ad- or absorb.

Preferred metal salts capable of binding ammonia (and releasing it again under appropriate conditions) are metal (ammine) salts of the general formula: $M_a(NH_3)_rX_z$, wherein M is one or more cations selected from alkali metals such as Li, Na, K or Cs, alkaline earth metals such as Mg, Ca, Ba or Sr, and/or transition metals such as V, Cr, Mn, Fe, Co, Ni, Cu, or Zn or combinations thereof such as NaAl, KAl, $K_2Zn$, CsCu, or $K_2Fe$, X is one or more anions selected from fluoride, chloride, bromide, iodide, nitrate, thiocyanate, sulphate, molybdate, and phosphate ions, a is the number of cations per salt molecule, z is the number of anions per salt molecule. r is the coordination number of ammonia. When r=zero, the metal (ammine) salt is free of ammonia, and has the formula $M_aX_z$. When the metal (ammone) salt is saturated, $r=r_{max}$. $r_{max}$ is a characteristic number for each individual salt is usually in the range of 2 to 12. In $Sr(NH_3)_rCl_2$, e.g., $r_{max}$ is 8. In a partially saturated metal (ammine) salt, $0<r<r_{max}$. The term metal (ammine) salt is herein used, to denote all three possible saturation states of the salt, and it is indicated by "free of ammonia", "partially saturated" or "saturated", which of the three states is meant.

$SrCl_2$, $CaCl_2$ and $MgCl_2$ are preferred metal (ammine) salts free of ammonia).

In the following, embodiments are discussed wherein $Q_{ext}=0$. If e.g. a reactor is filled with n moles of a metal (ammine) salt free of ammonia ("storage material") with a maximum coordination number (maximum molar ammonia storage capacity) $r_{max}$, the possible amount of stored ammonia, $m_s$, is $m_s=r_{max} \cdot n$. The ammonia molecules of different saturation stages in a metal (ammine) salt, e.g. $Sr(NH_3)_iCl_2$, wherein i∈N and $1 \leq i \leq r_{max}$, usually have different absorption energies $E_i$, where $E_i$ is the absorption energy from gaseous ammonia. The average absorption energy from gaseous ammonia is $$\overline{E}_a = \frac{1}{r}\sum_{1}^{r} E_i,$$

wherein $r=r_{max}$. The amount of heat released during absorption of that ammonia amount ($m_s$) from liquid ammonia is then given by, $Q_{abs}=m_s(\overline{E}_a-E_e)$, where the evaporation enthalpy for liquid ammonia is subtracted from the absorption energy. This amount of heat corresponds to evaporating an excess amount of ammonia, $m_e$, given by:

$$m_e = \frac{Q_{abs}}{E_e} = m_s \frac{(\overline{E}_a - E_e)}{E_e}.$$

During the reaction, a total amount of liquid ammonia $m_{tot}=m_s+m_e=m_s+m_s(\overline{E}_a-E_e)/E_e$ may be dosed into the reactor giving a mixture of storage material and ammonia. While liquid ammonia is dosed, the reaction components are mixed adequately, either passively or actively. Immediately after the absorption process has started, heat is released into the reaction mixture, where it will be consumed or absorbed by evaporating liquid ammonia, thereby generating gaseous ammonia. As soon as the pressure reaches a threshold value, $p_s$, a pressure control device will discharge gaseous ammonia from the reactor. As long as liquid ammonia is present, temperature and pressure in the reactor will remain at levels according to the phase diagram of ammonia (see FIG. 6). The evaporated amount of ammonia directly reflects the advancement of the saturation process. When the material is fully saturated no more heat is developed and evaporation stops. The saturated metal (amine) salt can then be removed from the reactor. If the pressure $p_s$ is chosen such that the process temperature is different from the temperature of the surroundings the reactor can optionally be insulated so that no heat is removed from or added to the reactor.

In embodiments the total amount of liquid ammonia is dosed at a rate that is either higher, e.g. 10 times higher than the maximum absorption rate. When liquid ammonia is dosed at a rate that is higher than the maximum absorption rate, there will be a temporary surplus of liquid ammonia in the reactor. The liquid ammonia may also be dosed at a rate similar to the maximum absorption rate.

When liquid ammonia (1) is dosed at a rate that is lower than the maximum absorption rate, the absorption rate will be limited by and proportional to the dosing rate.

In one embodiment the material capable of binding ammonia and liquid ammonia are actively mixed by physical stirring, rotation, vibration, or fluidization.

In other embodiments the material capable of binding ammonia and the liquid ammonia 1 are not actively mixed.

If the reaction pressure is about 8 bar, the reaction will run close to room temperature. At a higher operating pressure the temperature is higher and at a lower pressure the temperature is lower. For safety reasons it is advantageous to control the pressure such that temperature is close to or lower than at ambient. However, if the temperature is too low the absorption reaction is slow, which is a disadvantage, when high production rates are desired. For the saturation, e.g. of $SrCl_2$, the pressure range 1-15 bar is a good compromise between safety and reaction speed. Using 4-10 bar is more preferred. A specifically attractive operating pressure is one that results in a process temperature which is the same as the ambient temperature, e.g. 8.5 bar where the corresponding temperature is around 20° C. In this case no heat is exchanged with the surroundings which eliminates the need for external heat exchangers or insulation.

The process of the invention may be carried out as a batch process or a continuous process where material capable of binding ammonia and free of ammonia or partially saturated and liquid ammonia are supplied continuously to the processing equipment from one or more storage containers.

In one embodiment, the gaseous ammonia that results from the amount of liquid ammonia serving as a cooling agent by the evaporation thereof is liquefied and recycled into the treatment procedure.

In summary, the present invention is a method for accelerated saturation of ammonia ad- or absorbing materials (storage materials) in which the unsaturated material is mixed with a well defined amount of liquid ammonia or a mixture of liquid ammonia and another cooling agent. The amount of liquid ammonia or of liquid ammonia plus another cooling agent is determined as the amount needed to saturate the storage material-plus an amount needed to compensate for the heat released during saturation through evaporation.

The merits of the invention are:
a short saturation time,
a high saturation level,
safe operation,
easy to scale up,
can be implemented both as batch and continuous production,
robust method,
controlled heat exchange between process and surroundings.

Turning now to the figures, FIG. 1 shows the basic principle of the invention. A container 5 (the reactor) where mixing and saturation takes place is equipped with an inlet for liquid ammonia 1, an inlet for storage material (material capable of ad- or absorbing ammonia) 2 and a pressure control device 6 capable of releasing gaseous ammonia 4 at a specified pressure. The heat generated from saturation is removed by evaporating liquid ammonia 1 to gaseous ammonia 4 through the pressure control device 6, thereby keeping the pressure in the reactor 5 at a specified pressure, $p_s$. The product 3 is saturated storage material.

Figure 2:
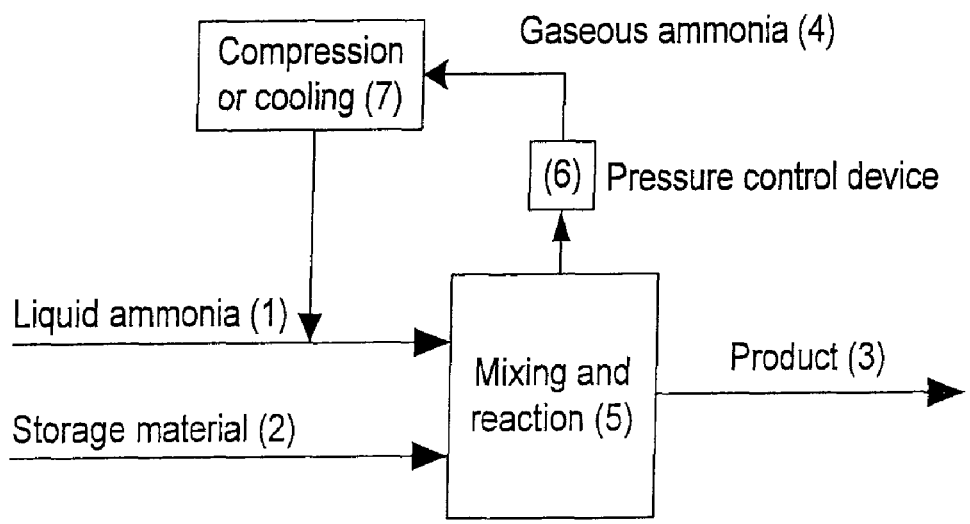
FIG. 2 shows a process flow scheme according to a second embodiment of the present process.

According to the process of FIG. 2, liquid ammonia 1 and storage material 2 is delivered to a reactor 5 where mixing and saturation takes place. The heat generated from saturation is removed by evaporating liquid ammonia 1. The gaseous ammonia 4 is through a pressure control device 6 to a compressor and/or heat exchanger 7 where it is liquefied and recirculated. Pressure control device 6 may be an integrated part of compressor 7. The recirculated liquid ammonia is then mixed with the inlet stream of liquid ammonia 1 and reused in the process. The product 3 is saturated storage material.

Figure 3:
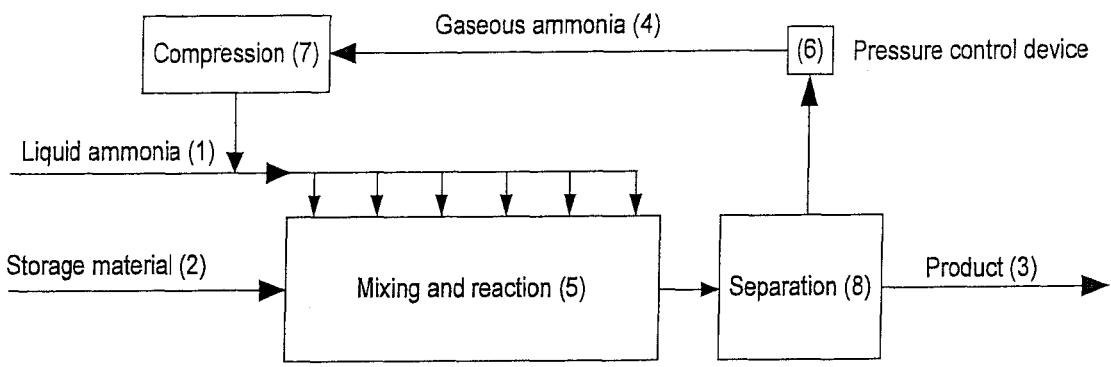
FIG. 3 is a process flow scheme according to a third embodiment of the present process.

The process shown in FIG. 3 is a continuous process where storage material 2 and liquid ammonia 1 are supplied continuously to the processing equipment from one or more storage containers. In a continuous process, the overall ratio of flow of ammonia 1 and storage material 2 is the same as the ratio of mass of ammonia and storage material that is used in a batch process. The storage material is delivered to a container 5 where active mixing and the saturation reaction takes place. As the storage material 2 is transported through the reaction zone it will be mixed with appropriate amounts of liquid ammonia 1. The amount of liquid ammonia 1 is dosed at the same rate as the saturation process proceeds. The residence time in the reactor 5 is long enough to achieve a high degree of ammonia saturation in the storage material. The heat generated by the saturation process is removed by evaporating liquid ammonia 1. The reaction mixture (product and ammonia) is conveyed to a separating unit 8, where ammonia is separated from the saturated product. The product 3, i.e. the saturated storage material, is conveyed to a storage container (not shown), and gaseous ammonia 4 is passed through a pressure control device 6 to a compressor and/or a heat exchanger 7 from where it is recirculated and mixed with the liquid ammonia inlet stream 1.

In an embodiment not shown the separating unit 8 is integrated in the reactor 5.

Figure 4:
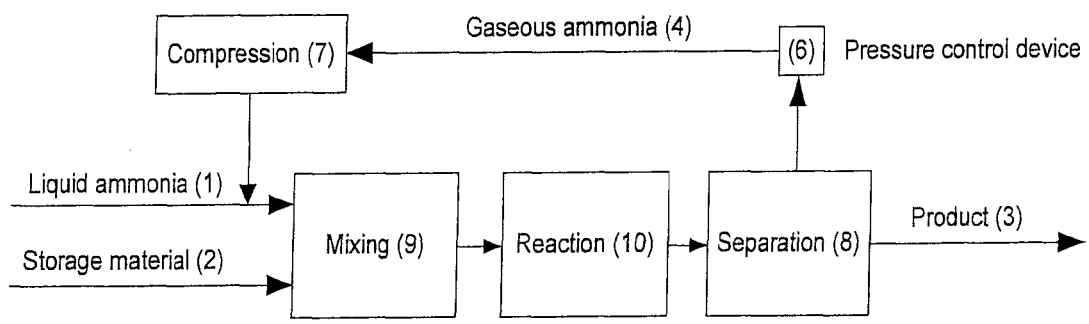
FIG. 4 is a process flow scheme according to a fourth embodiment of the present process.

In the process shown in FIG. 4 the total amount of liquid ammonia 1 is dosed and mixed with the storage material 2 in a separate mixing unit 9 before the reactor 5. In the mixing unit 9, mixing will be fast and the residence time short. In the reactor 10 there will be a reduced level of mixing, but a residence time which is long enough to ensure a high degree of saturation of the storage material 2. The heat generated from saturation is removed by evaporating liquid ammonia 1. After reaction in reactor 10 the mixture is led to a separating unit 8 where gaseous ammonia 4 is separated from the product 3, the saturated storage material. The gaseous ammonia 4 is passed through pressure control device 6 to a compressor and/or heat exchanger 7 where it is liquefied and recirculated.

In an embodiment not shown the mixing unit 9 is integrated into the reactor 10.

Figure 5:
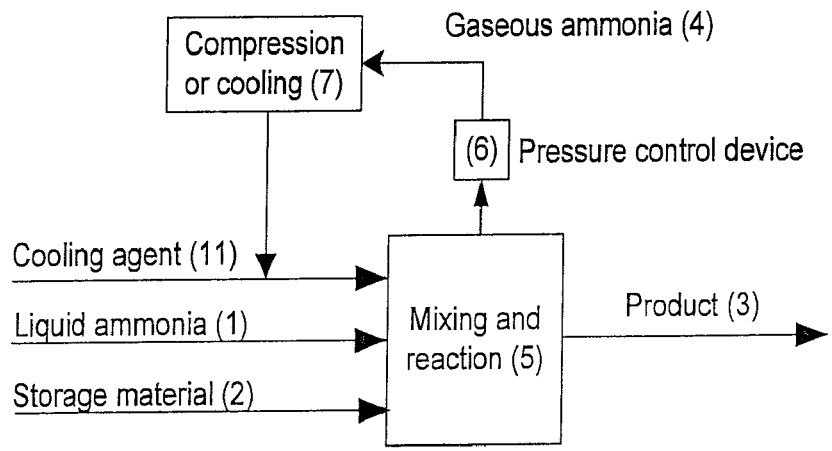
FIG. 5 is a process flow scheme according to a fifth embodiment of the present process.

In the process of FIG. 5 only the ammonia required for saturating the storage material 2 will be supplied from the liquid ammonia inlet stream 1. An alternative cooling agent 8 will serve only for cooling the reaction by evaporation. The major part of the gas stream 4 will thus consist of the alternative gaseous cooling agent, which will be led through a pressure control device 6 to the compressor and/or heat exchanger 7 where it is liquefied and recirculated to the reactor 5. The alternative coolant agent is selected from the cooling agents mentioned above.

FIG. 6 shows the phase diagram and evaporation curve of ammonia.

EXAMPLES

Example 1

One mole $SrCl_2$ can bind r=8 mole of $NH_3$ as $Sr(NH_3)_8Cl_2$. The average absorption energy of ammonia in $SrCl_2$ is $\overline{E}_a$=42.2 kJ/mole. 1000 kg of $SrCl_2$ with a molar mass of 158.5 g/Mole corresponds to n=6.4×10³ mole that can bind $m_s$=50.5×10³ mole of $NH_3$. The amount of $NH_3$ needed for removal of excess heat is then $$m_e = m_s \frac{\overline{E}_a - E_e}{E_e} = 40.5 \times 10^3$$

mole of $NH_3$. The total minimum amount of ammonia needed for the process is then $m_{tot}$=91×10³ mole or 1550 kg.

If the same calculation was done for $CaCl_2$, the result would be in the same range, since the binding energy of ammonia to $CaCl_2$ is similar to that of $SrCl_2$. For $MgCl_2$, the average absorption energy is approximately $E_b$=65 kJ/mole, which gives considerably higher mass of ammonia needed to be supplied to the saturation process to balance the higher heat release per ammonia molecule from the formation of $Mg(NH_3)_6Cl_2$ compared to $Sr(NH_3)_8Cl_2$.

Example 2

In one experiment 3 kg of $SrCl_2$ is saturated with ammonia in a rotating vessel. A total amount of ammonia of 4.65 kg is dosed into the system at a rate 150 g/min at a vessel pressure of 8 bar. The salt is saturated to more than 95% within 35 minutes. The reactor temperature is close to room temperature at all times.

Example 3

Example 3 is similar to Example 2 except that the total amount of ammonia is dosed within the first 2 minutes. After 25 minutes release of excess ammonia stops and the material is saturated to a degree of more than 95%.

Example 4

Same as Example 2 except that the system pressure is 6 bar. The process temperature is approximately 10° C. lower and the process time increases to 40 minutes. Alternatively, the saturation rate is increased by running the process at higher pressure, for example 15 bar, where the process temperature is higher and the kinetics faster.

Example 5

Example 5 is similar to Example 2, but with varying the water content in the range of 0.05-4% as well as varying the formulation of the unsaturated storage material (powder, granules). This does not influence the process.

All patents, patent applications and other documents cited are hereby incorporated into this specification by reference.

The invention claimed is:

1. A process for saturating a solid material capable of binding ammonia by ad- or absorption and initially free of ammonia or partially saturated with ammonia, wherein said process comprises treating said solid material under a pressure and associated temperature located on the vapor pressure curve of ammonia with an amount of liquid ammonia sufficient to saturate said solid material and an additional amount of a cooling agent selected from the group consisting of liquid ammonia, liquid or solid $CO_2$, hydrocarbons and hydrohalocarbons that have a vapor pressure higher than ammonia, ethyl ether, methyl formate, methyl amine and ethyl amine in a reactor, such that $|Q_{abs}| \leq |Q_{evap}| + Q_{ext}$, wherein $Q_{abs}$ is the amount of heat released from said solid material when it absorbs ammonia from the liquid phase thereof to the point where it is saturated with ammonia, $Q_{evap}$ is the amount of heat absorbed by said cooling agent when it evaporates, and $Q_{ext}$ is the amount of heat exchanged with the surroundings and is positive, if heat is removed from the process by external cooling, and negative, if heat is added to the process from the surroundings.

2. The process according to claim 1, wherein said solid material capable of binding ammonia by absorption and initially free of ammonia or partially saturated with ammonia is a metal (ammine) salt having the general formula: $M_a(NH_3)_rX_z$, wherein M is one or more cations selected from alkali metals such as Li, Na, K or Cs, alkaline earth metals such as Mg, Ca, Ba or Sr, and/or transition metals such as V, Cr, Mn, Fe, Co, Ni, Cu, or Zn or combinations thereof such as NaAl, KAl, $K_2$Zn, CsCu, or $K_2$Fe, X is one or more anions selected from fluoride, chloride, bromide, iodide, nitrate, thiocyanate, sulfate, molybdate, and phosphate ions, a is the number of cations per salt molecule, z is the number of anions per salt molecule, and r is zero or lower than the highest possible value of r for a specific metal (ammine) salt free of ammonia or partially saturated with ammonia; and wherein r and is the highest possible value of r, $r_{max}$, for a specific metal (ammine) salt at the point where said metal (ammine) salt is saturated with ammonia.

3. The process of claim 2, wherein the total amount of liquid ammonia $m_{tot}$ with which said metal (ammine) salt which is initially free of ammonia such that r is initially zero is treated, and which acts as a saturation agent and the cooling agent simultaneously, fulfills $$m_{tot} = m_s + m_s(\overline{E}_a - E_e)/E_e$$

wherein $m_s$ is $r_{max} \cdot n$, wherein n is the moles of salt present $E_e$ is the evaporation enthalpy of ammonia, and $$\overline{E}_a = \frac{1}{r}\sum_1^r E_i,$$

wherein $\overline{E}_a$ is the average molar binding energy of ammonia, in a metal (ammine) salt wherein $r=r_{max}$ and $E_i$ is the molar binding energy of ammonia in a metal (ammine) salt wherein $r=r_{max}$ of an individual ammonia molecule in a metal (ammine) salt, wherein $r=r_{max}$, i∈N with $1 \leq i \leq r$, and $r=r_{max}$.

4. The process according to claim 2, wherein the metal (ammine) salt free of ammonia is $SrCl_2$, $CaCl_2$, $MgCl_2$ or mixtures thereof.

5. The process of claim 1, wherein $Q_{ext}$=0.

6. The process according to claim 1 wherein the cooling agent is ammonia.

7. The process according to claim 6, wherein the gaseous ammonia that results from the amount of liquid ammonia serving as a cooling agent by the evaporation thereof is liquefied and recycled into the treatment procedure.

8. The process according to claim 1, wherein said liquid ammonia quantity is dosed at a rate higher than the maximum absorption rate.

9. The process according to claim 8, wherein said liquid ammonia is dosed at a rate at least 10 times faster than the maximum absorption rate.

10. The process according to claim 1, wherein said liquid ammonia is dosed at a rate similar to the maximum absorption rate.

11. The process according to claim 1, wherein said solid material capable of binding ammonia and said liquid ammonia are actively mixed.

12. The process according to claim 1, wherein at least parts of the process are conducted at a constant pressure.

13. The process according to claim 12, wherein said pressure is of from 1 to 15 bar.

14. The process according to claim 13, wherein said pressure is of from 4 to 10 bar.

15. The process according to claim 12, wherein said pressure corresponds to an operating temperature which is ambient temperature.

16. The process according to claim 1 which is carried out as a batch process.

17. The process according to claim 1 which is carried out as a continuous process.

* * * * *